(12) United States Patent
Souyri et al.

(10) Patent No.: US 11,125,676 B2
(45) Date of Patent: Sep. 21, 2021

(54) METHOD FOR DETERMINING THE STATIC FRICTION COEFFICIENT FOR A SHOE SOLE

(71) Applicant: COMPAGNIE GENERALE DES ETABLISSEMENTS MICHELIN, Clermont-Ferrand (FR)

(72) Inventors: Philippe Souyri, Clermont-Ferrand (FR); Emmanuel Igier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 24 days.

(21) Appl. No.: 16/491,778

(22) PCT Filed: Mar. 6, 2018

(86) PCT No.: PCT/IB2018/051443
§ 371 (c)(1),
(2) Date: Sep. 6, 2019

(87) PCT Pub. No.: WO2018/163069
PCT Pub. Date: Sep. 13, 2018

(65) Prior Publication Data
US 2020/0033253 A1    Jan. 30, 2020

(30) Foreign Application Priority Data
Mar. 8, 2017   (FR) ...................................... 1770224

(51) Int. Cl.
*G01N 19/02* (2006.01)
*G01N 3/56* (2006.01)

(52) U.S. Cl.
CPC ............... *G01N 19/02* (2013.01); *G01N 3/56* (2013.01)

(58) Field of Classification Search
CPC ................................... G01N 19/02; G01N 3/56
See application file for complete search history.

(56) References Cited

U.S. PATENT DOCUMENTS 2,048,837 A * 7/1936 Byers ................... A43D 999/00
                                                                     12/4.1
2,638,776 A * 5/1953 Aines ....................... G01N 3/56
                                                                          73/7

(Continued)

FOREIGN PATENT DOCUMENTS

CN           105606527 A      5/2016
EP               0332848 A2 *  9/1989   ............. G01N 19/02

(Continued)

*Primary Examiner* — David A. Rogers
(74) *Attorney, Agent, or Firm* — Venable LLP

(57) ABSTRACT

A method for determining the static friction coefficient of a shoe sole (2) using a test bed (1) comprising a measuring surface (3) with known friction features; a bearing member (4) producing a bearing force Fz on the sole (2); and a traction member (5) capable of generating a movement between the sole (2) and the measuring surface (3); said method comprising the following steps: positioning at least one portion of a sole (2) to be tested on the measuring surface (3); applying a bearing force Fz on the sole (2); gradually causing a movement to be applied to the traction member (5); recording the values of Fx and Fz; and determining the static friction coefficient Mu.

16 Claims, 1 Drawing Sheet

(56) References Cited

U.S. PATENT DOCUMENTS

| | | | | |
|---|---|---|---|---|
| 3,516,281 | A * | 6/1970 | Taub | A43D 999/00 73/7 |
| 3,535,911 | A | 10/1970 | Armstrong et al. | |
| 3,608,372 | A * | 9/1971 | Hovey et al. | A43D 999/00 73/150 R |
| 3,975,940 | A * | 8/1976 | Brungraber | G01N 19/02 73/9 |
| 3,977,231 | A * | 8/1976 | Haehner | G01N 19/02 73/9 |
| 4,096,733 | A * | 6/1978 | Cohen | A43D 999/00 73/7 |
| 4,130,007 | A * | 12/1978 | Hayashi | A43D 999/00 73/172 |
| 4,187,714 | A * | 2/1980 | Cox | G01N 19/02 73/488 |
| 4,194,387 | A * | 3/1980 | Hofbauer | G01N 19/02 73/9 |
| 4,315,426 | A * | 2/1982 | Brandon | G01N 19/02 73/146 |
| 4,327,572 | A * | 5/1982 | Pitman | G01N 3/56 73/7 |
| 4,432,223 | A * | 2/1984 | Paquette | A43D 999/00 73/7 |
| 4,524,602 | A * | 6/1985 | Moore | G01N 19/02 73/146 |
| 4,633,702 | A * | 1/1987 | Kaiser | G01N 19/02 73/168 |
| 4,712,418 | A * | 12/1987 | Augustin | G01N 19/02 73/10 |
| 4,722,218 | A * | 2/1988 | Strader | G01N 19/02 73/9 |
| 4,813,266 | A * | 3/1989 | Nash | G01N 19/02 702/141 |
| 5,195,357 | A * | 3/1993 | Takino | G01N 19/02 374/45 |
| 5,245,856 | A * | 9/1993 | Pazzaglia | G01N 19/02 73/9 |
| 5,259,236 | A * | 11/1993 | English | G01N 19/02 73/9 |
| 5,465,605 | A * | 11/1995 | Smith | G01N 3/32 73/7 |
| 5,563,329 | A * | 10/1996 | Smith | G01N 3/56 73/12.01 |
| 5,576,478 | A * | 11/1996 | Brungraber | G01N 19/02 73/9 |
| 5,734,088 | A * | 3/1998 | Gunderson | G01N 19/02 73/9 |
| 6,349,587 | B1 * | 2/2002 | Mani | G01N 19/02 73/9 |
| 6,397,672 | B1 * | 6/2002 | Ramkumar | G01N 19/02 73/159 |
| 6,487,891 | B2 * | 12/2002 | Moretti | A43D 1/06 73/38 |
| 6,494,076 | B1 * | 12/2002 | Gent | G01N 19/02 73/9 |
| 6,679,106 | B1 * | 1/2004 | Abe | G01B 11/30 73/1.89 |
| 6,854,316 | B2 * | 2/2005 | Hage | G01N 19/02 73/9 |
| 6,918,695 | B2 * | 7/2005 | Polegato Moretti | A43B 3/0005 374/142 |
| 7,000,451 | B1 * | 2/2006 | Wegand | G01N 19/02 73/105 |
| 7,290,436 | B2 * | 11/2007 | Olde Weghuis | G01N 19/02 73/10 |
| 7,597,017 | B2 * | 10/2009 | Bedard | G09B 23/32 434/256 |
| 7,600,411 | B2 * | 10/2009 | Bailey | G01N 19/02 73/9 |
| 7,614,275 | B2 * | 11/2009 | Lin | G01N 19/02 73/9 |
| 7,788,965 | B2 * | 9/2010 | Arnold | G01N 19/02 73/9 |
| 8,573,028 | B2 * | 11/2013 | Chen | G01N 19/02 73/7 |
| 8,869,589 | B2 * | 10/2014 | Lappe | G01N 19/02 73/9 |
| 9,423,328 | B2 * | 8/2016 | Patel | A43B 13/20 |
| 9,464,980 | B2 * | 10/2016 | Yngve | G01N 19/02 |
| 2004/0149005 | A1 * | 8/2004 | Hage | G01N 19/02 73/9 |
| 2004/0187556 | A1 * | 9/2004 | Abe | G01N 19/02 73/9 |
| 2006/0277973 | A1 * | 12/2006 | Bailey | G01N 19/02 73/9 |
| 2008/0156067 | A1 * | 7/2008 | Lin | G01N 19/02 73/9 |
| 2009/0320556 | A1 * | 12/2009 | Collins | G01N 19/02 73/9 |
| 2011/0132068 | A1 * | 6/2011 | Chen | G01N 19/02 73/7 |
| 2012/0240660 | A1 | 9/2012 | Johnson | |
| 2012/0297889 | A1 * | 11/2012 | Yngve | G01N 19/02 73/818 |
| 2014/0013822 | A1 | 1/2014 | Johnson | |
| 2014/0116109 | A1 | 5/2014 | Johnson | |
| 2015/0276578 | A1 | 10/2015 | Johnson | |
| 2019/0084772 | A1 * | 3/2019 | Andreoli | B65G 45/24 |
| 2019/0369005 | A1 * | 12/2019 | Gray | G01N 19/02 |

FOREIGN PATENT DOCUMENTS

| | | | |
|---|---|---|---|
| EP | 2578102 A1 * | 4/2013 | G01N 3/56 |
| FR | 2751748 A1 | 1/1998 | |
| JP | 2775408 B2 * | 7/1998 | |
| WO | 2004/051239 A1 | 6/2004 | |
| WO | 2010/125289 A1 | 11/2010 | |

* cited by examiner

METHOD FOR DETERMINING THE STATIC FRICTION COEFFICIENT FOR A SHOE SOLE

TECHNICAL FIELD OF THE INVENTION

The present invention relates to a method for determining the static friction coefficient of a shoe sole using a test bed, a method for measuring the slip resistance of a sole. It also makes provision for the corresponding test bed.

PRIOR ART

Patent application WO 2004/051239 proposes a method for measuring the friction coefficient of an element on a surface to be tested by rotating the element bearing on the surface to be tested. The precise conditions of the measurements to be performed are not specified.

Document FR 2751748 discloses a method for characterizing a surface by measuring the heating up resulting from the friction between a shoe and the surface to be tested.

Standard EN 13287 discloses a method for measuring, under precise conditions, the slip resistance level of safety shoes. The standard also makes provision for applying a speed of 300 mm/s between the shoe and the bearing surface.

In these various documents, the test conditions and the parameters that are taken into account during measurements do not allow reliable, precise and repetitive measurement of the capabilities of the shoes to avoid or to delay entering slip mode. However, for many uses of the shoes such as, for example, for safety, sport, or other activities, this feature is more appropriate for assessing the abilities of the soles to maintain their grip for as long as possible.

In order to overcome these various disadvantages, the invention provides various technical means.

SUMMARY OF THE INVENTION

Firstly, a first aim of the invention involves determining a means for reliably, and with a high level of precision, comparing the grip performance levels of various shoe soles.

Another aim of the invention involves providing a means for reliably determining, and with a high level of precision, the non-slip performance levels of a shoe sole.

A further aim of the invention involves ensuring that the key point (maximum) for determining the static friction coefficient with high precision is definitely taken into account in all cases.

A still further aim of the invention involves providing a means for assessing or quantifying the features of shoes with respect to certain specialized uses requiring specific technical features, such as safety (non-slip), climbing, sport. In this latter case, measurements for assessing the playabilities are sought.

To this end, the invention provides a method for determining the static friction coefficient of a shoe sole using a test bed comprising:
- a measuring surface with known friction features and that is capable of supporting at least one portion of a shoe sole to be tested;
- a bearing member producing a bearing force Fz on the sole on the measuring surface on which the sole to be measured is placed;
- a traction member capable of generating a movement between the sole and the measuring surface (by acting on the sole or on the measuring surface); said method comprising the following steps:
  - positioning at least one portion of a sole to be tested on the measuring surface of the test bed;
  - applying a setpoint bearing force Fz on the sole using the bearing member;
  - gradually causing a movement to be applied to the traction member (preferably with regulation of the speed and movement control);
  - recording the values of Fx and Fz in real time at determined time intervals;
  - determining the static friction coefficient Mu by identifying the maximum value of the Fx/Fz ratio;
  the maximum relative distance covered between two measuring points is from 0.01 to 0.1 mm, and more preferably from 0.01 to 0.05 mm, and even more preferably from 0.01 to 0.03 mm.

Unlike the known methods that aim to detect the slip resistance force at a stabilized speed (in slip mode, which corresponds to a dynamic friction coefficient), the present method allows the static friction coefficient to be determined, which is a characteristic value that is particularly useful for comparing the performance levels of soles with respect to their ability to avoid entering slip mode. With slip-related accidents occurring as a result of entering slip mode, the value of the static Mu is much more relevant in terms of the performance levels of a sole for a given ground surface.

The speed applied by the traction member is adapted to the type of ground surface and of sole that are used (for example, 0.02 m/s for a conventional ground surface). It is also relatively low to facilitate taking measurements at the shortest possible relative movement intervals. Thus, compared to the speed of movement specified in standard EN 13287, the speed is divided by 15.

Taking measurements of the values of Fx and Fz at relatively short distance intervals, instead of at time intervals, ensures that all the relevant points, in particular the points for determining the maximum effective real value of the Fx/Fz ratio, are indeed measured. Moreover, targeting the measurements over a relative distance that is covered between the sole and the measuring surface, as opposed to as a function of time, ensures that the method is effective in all circumstances. More specifically, using the distance (with a very short distance) as a setpoint ensures that the maximum point is properly taken into account.

The method advantageously provides force sensors for measuring the forces Fx and Fz, wherein the Fx and Fz measurements are filtered by a low-pass filter applied to each of the measuring channels.

This approach allows more precise results to be obtained, in particular for determining the effective value of static Mu, since finding the maximum point on a curve must be undertaken in noiseless conditions.

The low-pass filter advantageously uses a moving average of each point using its neighbouring points corresponding to a time interval of less than 1 second, and more preferably of less than 0.6 seconds, and even more preferably of less than 0.3 seconds. For example, from one to around ten neighbouring points are used.

By way of a variant, the method provides a step of measuring the dynamic friction coefficient. This measurement corresponds to the value of Fx/Fz in a stabilized phase (that is a moving Mu on the graph of FIG. 2).

This embodiment enables a particularly precise measurement of the dynamic friction coefficient due to the fact that the measured value is properly decorrelated from the previously obtained value of the static coefficient.

The invention also provides a test bed for determining the static friction coefficient of a shoe sole comprising:

a measuring surface, the friction features of which are known;

a bearing member capable of producing a bearing force Fz on the sole on the measuring surface on which the sole to be measured is placed;

a traction member capable of causing a movement Dx to be applied to one of the elements of the measuring assembly, preferably the bearing member (4) or the measuring surface;

force sensors for measuring the forces Fx and Fz, wherein the Fx and Fz measurements are carried out in real time during the movement Dx;

a module for determining the static friction coefficient of the sole being tested, which module is connected to the bearing member and the traction member; the module (6) for determining the static friction coefficient comprises sub-modules for recording values of Fx and Fz as a function of the movement Dx of the traction module in which the maximum relative distance covered between two measuring points is 0.1 mm, and more preferably is 0.03 mm, and even more preferably is 0.01 mm.

Also advantageously, the module for determining the static friction coefficient comprises a low-pass filter applied to each of the measuring channels. The low-pass filter allows the spurious measuring noises to be removed that make a number of raw measurements practically unusable for precisely determining the static friction coefficient of a shoe sole.

The low-pass filter is preferably adapted to complete an average of each point using its neighbouring points corresponding to a time interval of less than 1 second, and more preferably of less than 0.6 seconds, and even more preferably of less than 0.3 seconds.

The module for determining the static friction coefficient is capable of comparing the values of Fx and Fz and of detecting the maximum value of the Fx/Fz ratio for a given test.

Depending on the case, the traction member acts on the bearing member or even on the measuring surface, or on both. In the latter case, the completed action is preferably in the opposite direction. The traction member allows a relative movement to be obtained of the sole to be measured relative to the measuring surface.

DESCRIPTION OF THE FIGURES

All the implementation details are provided in the following description, which is supplemented by FIGS. 1 and 2, which are only provided by way of non-limiting examples, and in which.

DETAILED DESCRIPTION OF THE INVENTION

Figure 1:
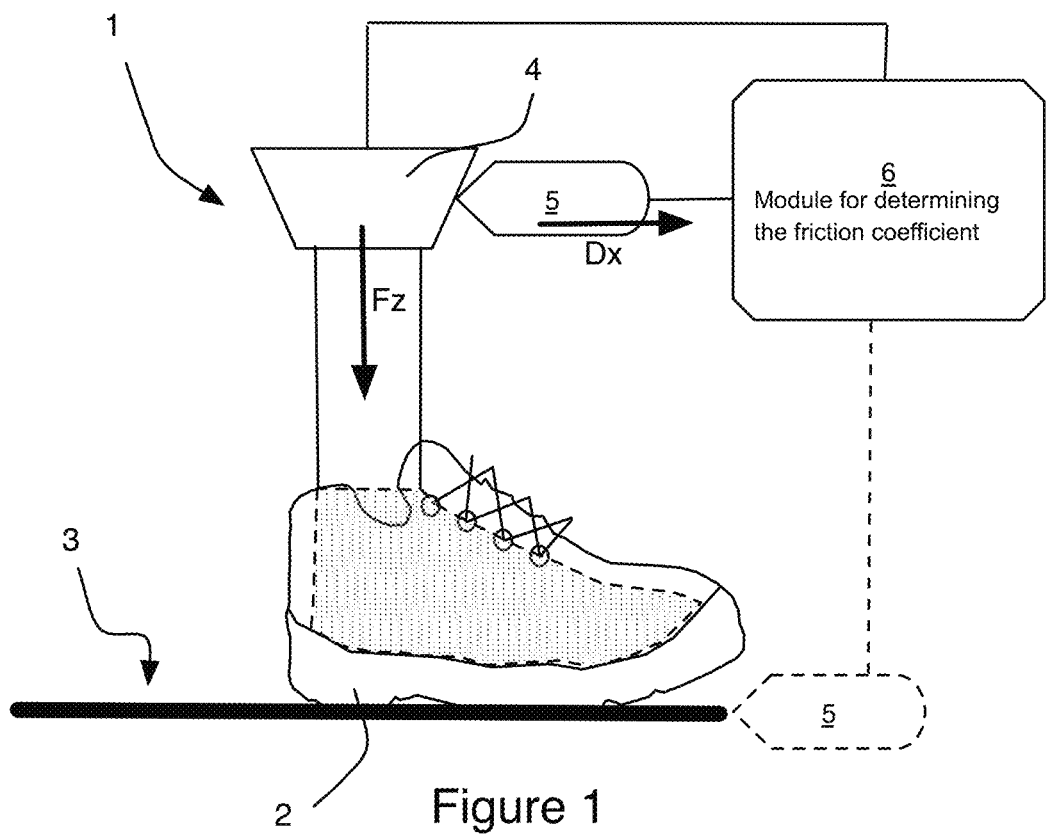
FIG. 1 is a schematic representation of a test bed for determining the static friction coefficient of a shoe sole.
Figure 2:
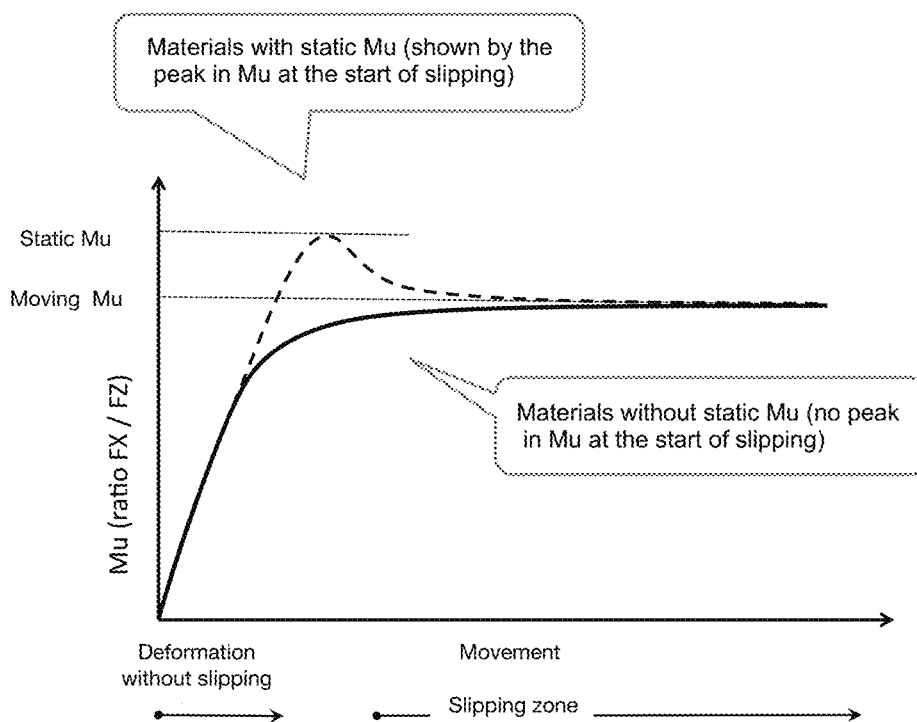
FIG. 2 shows a graph illustrating an example of results likely to be obtained with a test bed such as that of FIG. 1, showing values of static and dynamic friction coefficients as a function of the movement.

FIG. 1 is a schematic representation of a test bed 1 for determining the static friction coefficient of a shoe sole 2. It comprises a measuring surface 3. Preferably, a plurality of interchangeable measuring surfaces is provided, the friction features of which vary, so as to be able to proceed with measurements representing various usage contexts such as, for example, a ceramic ground surface (dry or wet), a concrete ground surface, or various surfaces such as ice, abrasive paper (for example, P180), or other surfaces.

The measuring surface advantageously is substantially flat and is arranged along a substantially horizontal plane.

A bearing member 4, which is provided, for example, above the measuring surface 3, allows a force Fz to be produced against the sole 2 so that said sole bears on the measuring surface 3 on which the sole to be measured is placed.

A traction member 5, such as a cylinder, for example, is arranged to cause a movement Dx to be applied to one of the elements of the measuring assembly, which is the bearing member 4 in the example shown. By way of a variant, shown as a dashed line, the movement Dx is applied to the measuring surface 3.

The measuring bed comprises force sensors for the force measurements Fx and Fz. These sensors are integrated and are not shown in the figure. Various types of known types of sensors such as, for example, piezoelectric sensors, can be used to implement these measuring functions.

The test bed also provides a module 6 for determining the static friction coefficient of the sole being tested. This module is connected to the bearing member 4 and the traction member 5 in order to receive the relevant effective data during the measuring phases. It also allows the bearing member 4 and the traction member 5 to be managed and controlled.

In the example shown, in order to allow the values of static Mu and of dynamic Mu to be computed, the module 6 for determining the static friction coefficient comprises sub-modules for recording values of Fx and of Fz as a function of the movement Dx of the traction module. It also comprises a low-pass filter applied to each of the measuring channels. This filter is particularly useful and effective for removing the spurious measuring noises. By virtue of this filter, the results of computations are more reliable and more precise, and the obtained value of Mu is particularly relevant.

The low-pass filter is designed to complete an average of each point using a determined number of neighbouring points. For example, the neighbouring points are selected over a time interval of less than 1 second, and more preferably of less than 0.6 seconds, and even more preferably of less than 0.3 seconds.

The computation of the maximum value of the Fx/Fz ratio by the module 6 allows the value of the static friction coefficient to be obtained for a given test.

The maximum relative distance covered between two measuring points is from 0.01 to 0.1 mm, and more preferably is from 0.01 to 0.05 mm, and even more preferably is from 0.01 to 0.03 mm.

REFERENCE NUMBERS USED IN THE FIGURES

1 Test bed for measuring slip resistance
2 Sole
3 Measuring surface
4 Member for bearing on the sole
5 Traction member
6 Module for determining the friction coefficient

The invention claimed is:
1. A method for determining the static friction coefficient of a shoe sole using a test bed comprising a measuring surface, with known friction features and that is capable of supporting at least one portion of a shoe sole to be tested, a bearing member producing a bearing force Fz on the shoe sole on the measuring surface on which the shoe sole to be tested is placed, and a traction member capable of generating a movement between the shoe sole and the measuring surface, the method comprising the following steps:

positioning at least one portion of the shoe sole to be tested on the measuring surface of the test bed;

applying a setpoint bearing force Fz on the shoe sole using the bearing member;

applying, with the traction member, a traction force Fx to the measuring surface;

recording the values of Fx and Fz in real time at determined time intervals; and determining the static friction coefficient Mu by identifying the maximum value of the Fx/Fz ratio, wherein a maximum relative distance covered between two measuring points is from 0.01 to 0.1 mm.

2. The method according to claim 1, wherein the maximum relative distance covered between two measuring points is from 0.01 to 0.05 mm.

3. The method according to claim 2, wherein the maximum relative distance covered between two measuring points is from 0.01 to 0.03 mm.

4. The method according to claim 1, the forces Fx and Fz are measured using force sensors, and wherein Fx and Fz measurements are filtered by a low-pass filter.

5. The method according to claim 4, wherein the low-pass filter uses a moving average of each point using neighboring points corresponding to a time interval of less than 1 second.

6. The method according to claim 5, wherein the low-pass filter uses a moving average of each point using neighboring points corresponding to a time interval of less than 0.6 seconds.

7. The method according to claim 6, wherein the low-pass filter uses a moving average of each point using neighboring points corresponding to a time interval of less than 0.3 seconds.

8. The method according to claim 1, further comprising a step of measuring the dynamic friction coefficient.

9. A test bed for determining the static friction coefficient of a shoe sole comprising:

a measuring surface, friction features of which are known;

a bearing member capable of producing a bearing force Fz on the shoe sole on the measuring surface on which the shoe sole is placed to be measured;

a traction member capable of applying a traction force Fx to the measuring surface causing a movement Dx;

force sensors for measuring the forces Fx and Fz, where Fx and Fz measurements are carried out in real time during the movement Dx; and a module for determining the static friction coefficient of the shoe sole, the module being connected to the bearing member and the traction member, wherein the module for determining the static friction coefficient comprises sub-modules for recording values of Fx and Fz as a function of the movement Dx of the traction module in which the maximum relative distance covered between two measuring points is 0.1 mm.

10. The test bed according to claim 9, wherein the maximum relative distance covered between two measuring points is 0.03 mm.

11. The test bed according to claim 10, wherein the maximum relative distance covered between two measuring points is 0.01 mm.

12. The test bed according to claim 9, wherein the module for determining the static friction coefficient comprises a low-pass filter.

13. The test bed according to claim 12, wherein the low-pass filter is adapted to complete an average of each point using neighboring points corresponding to a time interval of less than 1 second.

14. The test bed according to claim 13, wherein the low-pass filter is adapted to complete an average of each point using neighboring points corresponding to a time interval of less than 0.6 seconds.

15. The test bed according to claim 14, wherein the low-pass filter is adapted to complete an average of each point using neighboring points corresponding to a time interval of less than 0.3 seconds.

16. The test bed according to claim 9, wherein the module for determining the static friction coefficient is capable of comparing the values of Fx and Fz and of detecting the maximum value of the Fx/Fz ratio for a given test.

\* \* \* \* \*